G. H. RUSSELL.
BOLL WEEVIL TRAP.
APPLICATION FILED MAY 31, 1917.

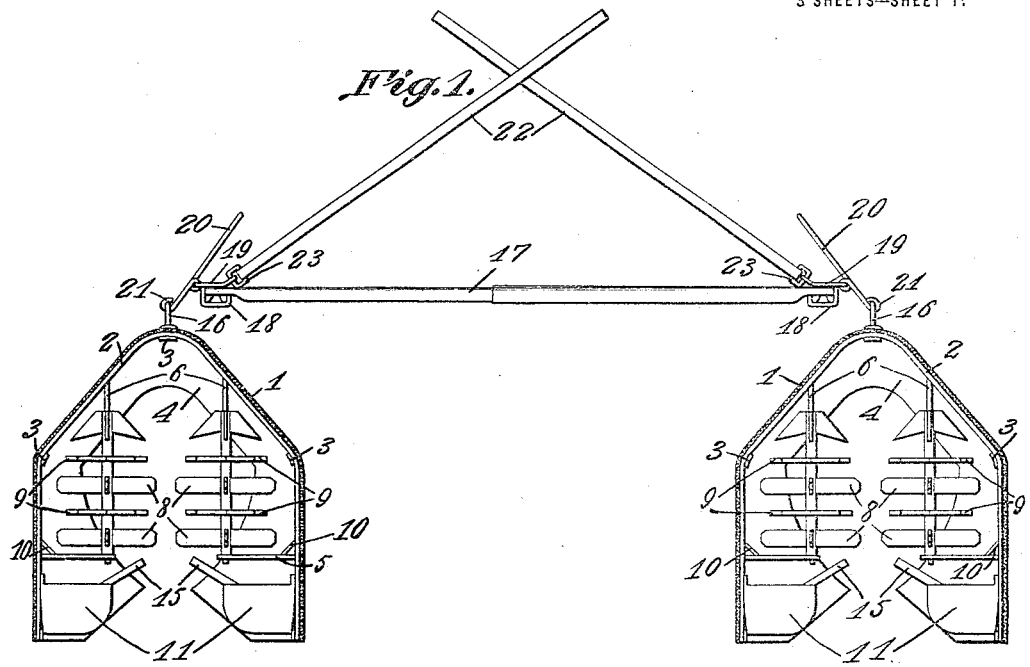
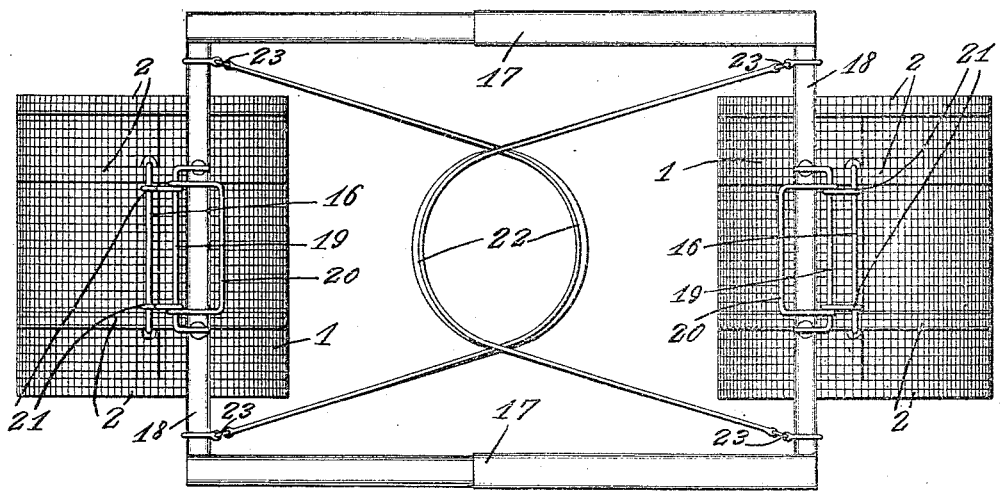

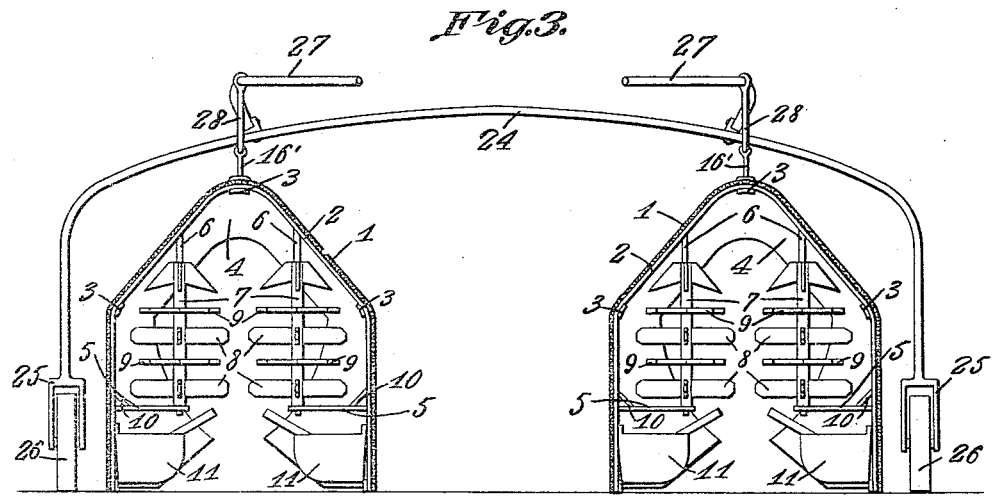
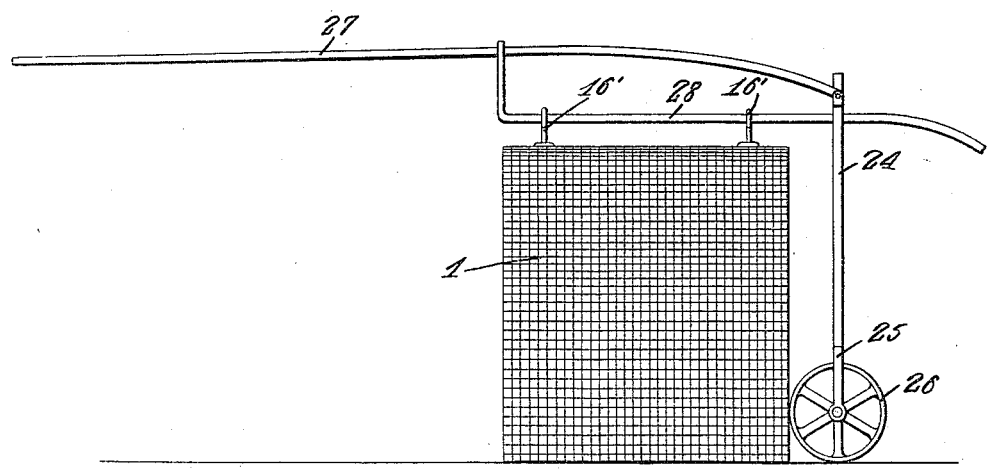

1,244,547.

Patented Oct. 30, 1917.
3 SHEETS—SHEET 3.

Witness
J. R. Tomlin
H. A. Mitchell

Inventor
G. H. Russell
By C. A. Snow & Co.
Attorney

UNITED STATES PATENT OFFICE.

GEORGE H. RUSSELL, OF FLORENCE, ALABAMA.

BOLL-WEEVIL TRAP.

1,244,547.   Specification of Letters Patent.   Patented Oct. 30, 1917.

Application filed May 31, 1917.   Serial No. 171,952.

*To all whom it may concern:*

Be it known that I, GEORGE H. RUSSELL, a citizen of the United States, residing at Florence, in the county of Lauderdale and State of Alabama, have invented a new and useful Boll-Weevil Trap, of which the following is a specification.

The subject of this invention is a boll weevil trap wherein rotary beaters or agitators are associated with weevil receiving troughs, and the objects of the invention are, first, to provide a weevil trap which will automatically remove the weevil from a plant, second, to provide beaters actuated by contact with a plant to remove the insects therefrom, third, to provide receptacles for the reception of the insects, fourth, to provide a trap of novel structural arrangement, fifth, to provide means for supporting the trap during transportation, sixth, to provide a simple and efficient trap.

While I have described this trap as a boll weevil trap, for which purpose it is primarily intended, it is understood that the trap may be used for catching other insects which infest plants, such as potato bugs and the like.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed, without departing from the spirit of the invention.

One practical embodiment of the invention is shown in the accompanying drawings, wherein:—

Figure 1 is a front elevation of traps constructed in accordance with my invention and showing them connected to a supporting frame;

Fig. 2 is a plan view of the same.

Fig. 3 is a front elevation of the traps secured to a modified form of support;

Fig. 4 is a side elevation of the same;

Figure 5:
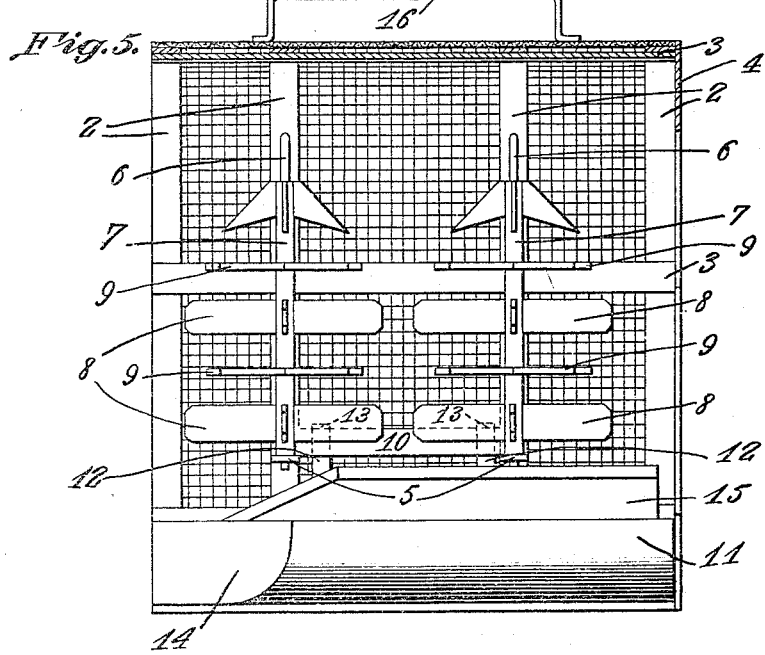
Fig. 5 is a vertical central longitudinal section of a trap.
Figure 6:
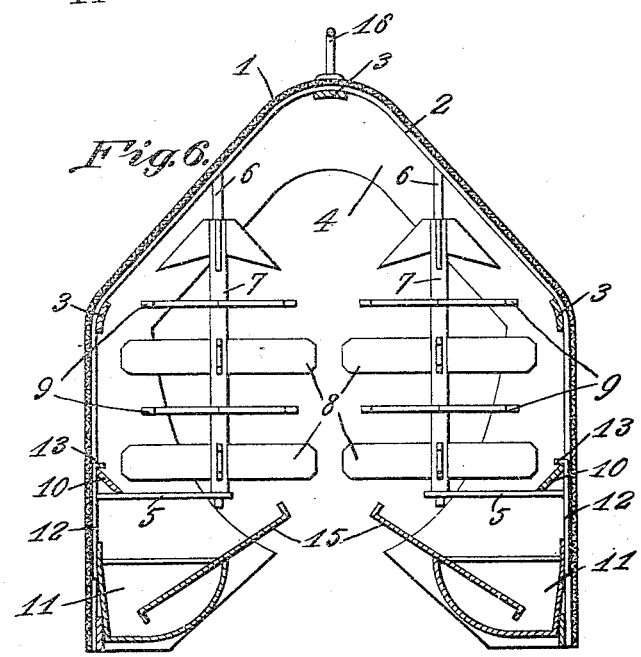
Fig. 6 is a vertical central cross section of the same.

Referring to the drawings by numerals of reference:—

The walls of the trap are preferably formed of wire mesh 1 and are formed with a central ridge from which the walls diverge downwardly and merge into vertically disposed depending portions. The wire mesh is retained in proper form by the ribs 2 across which are fastened the longitudinal supporting strips 3. The front end of the trap is open, as shown, but the rear end is partially closed by a plate 4 the central portion of which is cut away to form the irregular opening shown. Secured to the median ribs 2 near their lower ends and extending inwardly therefrom, are bracket arms 5. Vertically disposed rods 6 have their lower ends fastened in the bracket arms 5 and their upper ends secured in the median ribs 2, as shown.

Tubular shafts 7 turn on the rods 6 and each shaft 7 has secured thereon the spaced, readily extending, vertically disposed vanes 8. Secured to each shaft 7, and lying between and spaced from the spaced vanes 8, are radially extending, horizontally disposed vanes 9. An inclined guide bar 10 extends longitudinally of the trap at either side thereof and its ends are supported on and attached to the bracket arms 5 and median ribs 2.

A trough 11 extends along the lower edge of each side of the trap, and is detachably held in place by lugs 12 which rise from one edge of the trough and have hooked ends 13 which engage the inner edge of the bar 10. Each trough is formed with an inwardly and rearwardly inclined front face 14, and there is secured on the inner edge of each trough an inclined guide plate 15.

A handle 16 is soldered or otherwise secured to the ridge of the trap and serves as a means for suspending the trap from a carrier. The carrier consists of a rectangular frame having telescoping transverse bars 17 which are connected by the side bars 18. A rod 19 is rigidly secured to each side bar 18, as shown. The rod 19 passes through an eye formed at a median point on each side arm of a ball like handle 20 and the free end of each side arm is bent, as at 21, to pivotally engage the handle 16. Supporting straps 22 are provided, each of which has its ends secured to the ends of a side bar 18 by links 23 or otherwise.

In the modified form shown in Figs. 3 and 4 the carrier for the traps is in the form of a sulkey consisting of a curved supporting rod 24 in the forked ends 25 of which are journaled wheels 26 upon which the carrier travels. Shafts 27 are pivotally secured to the supporting rod and are provided for the purpose of hitching a horse to the carrier. An adjustable arm 28 is slidable on each shaft 27 and from each arm is suspended a trap, eye lugs 16' being provided on the trap for this purpose.

In practice the device operates as follows:—An insecticide is placed in the troughs 11 and they are hung in place in the trap. The carrier is suspended from the shoulders of the operator by crossing the straps 22, as shown most clearly in Figs. 1 and 2, and inserting the head through the loop so formed between the straps. The operator then has a trap suspended on each side of himself and passes between the rows of plants. Each trap will straddle a row of plants and, as the operator advances, the traps will be guided into position to straddle the plants by the inclined forward faces of the troughs. As the plants pass through the traps they will strike the vanes 8 and 9 and will cause them to revolve and knock weevil or other insects into the troughs or onto the guide plates from whence they will gravitate to the trough.

When the horse drawn carrier is used, the operator grasps the handles of the arms 28 and, by pulling the rods rearwardly or pushing them forwardly, he adjusts the traps to the plants.

Having described my invention, what I claim as new and desire to secure by Letters-Patent, is:—

1. A boll weevil trap, comprising a frame adapted to straddle a plant, bracket arms extending inwardly from the sides of the frame, an inclined supporting element secured to the bracket arms at each side of the frame and extending longitudinally of the frame, a trough hung from each supporting element, plant agitators turning in the frame and resting on the bracket arms, and means for suspending the frame.

2. A boll weevil trap, comprising a frame adapted to straddle a plant, a supporting element secured to and extending longitudinally of each side of the frame, a trough detachably hung from each supporting element, plant agitating means within the frame, and means for suspending the frame.

3. A boll weevil trap, comprising a frame adapted to straddle a plant, a supporting element secured to and extending longitudinally of each side of the frame, a trough hung from each supporting element, an inclined guide plate on the inner edge of each trough, plant agitators turning in the frame, and means for suspending the frame.

In testimony that I claim the foregoing as my own, I have hereto affixed my signature in the presence of two witnesses.

GEORGE H. RUSSELL.

Witnesses:
H. F. KOONCE,
W. A. FOX.